US010029688B2

(12) United States Patent
Khafagy et al.

(10) Patent No.: US 10,029,688 B2
(45) Date of Patent: Jul. 24, 2018

(54) CONTROLLING ENGINE AUTO-START WHILE IN REVERSE

(71) Applicant: FORD GLOBAL TECHNOLOGIES, LLC, Dearborn, MI (US)

(72) Inventors: Hafiz Shafeek Khafagy, Dearborn, MI (US); Kirk Pebley, Novi, MI (US); Eric Michael Rademacher, Royal Oak, MI (US); Hank L. Kwong, Farmington Hills, MI (US); Bang Kim Cao, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 337 days.

(21) Appl. No.: 15/072,656

(22) Filed: Mar. 17, 2016

(65) Prior Publication Data
US 2017/0267242 A1 Sep. 21, 2017

(51) Int. Cl.
*B60W 30/18* (2012.01)
*B60W 10/06* (2006.01)
(Continued)

(52) U.S. Cl.
CPC ...... *B60W 30/18036* (2013.01); *B60W 10/06* (2013.01); *B60W 10/11* (2013.01); *B60W 10/182* (2013.01); *F02D 41/065* (2013.01); *F02D 41/26* (2013.01); *F02N 11/0818* (2013.01); *B60W 2510/1005* (2013.01); *B60W 2540/12* (2013.01); *B60W 2710/1005* (2013.01); *B60W 2710/186* (2013.01); *F02D 2200/602* (2013.01); *F02N 11/006* (2013.01); *F02N 11/04* (2013.01); *F02N 11/0866* (2013.01); *F02N 15/08* (2013.01); *F02N 2011/0888* (2013.01);
(Continued)

(58) Field of Classification Search
CPC ............................................. B60W 30/18036
See application file for complete search history.

(56) References Cited

U.S. PATENT DOCUMENTS 6,287,236 B1 * 9/2001 Ishikawa .................. B60T 7/12
192/18 A
8,694,231 B2 4/2014 Ma et al.
(Continued)

FOREIGN PATENT DOCUMENTS

DE 10139855 A1 * 3/2003 ............ B60K 28/10

*Primary Examiner* — Tisha D Lewis
(74) *Attorney, Agent, or Firm* — David B. Kelley; Brooks Kushman P.C.

(57) ABSTRACT

A stop/start hybrid vehicle includes an engine configured for stopping and restarting during travel, a multiple-ratio transmission, a brake pedal, and an electronic parking brake. The transmission can be shifted into reverse gear either when the brake pedal is applied or unapplied. At least one controller is programmed to control the vehicle under these scenarios. If the engine is off and the brake pedal is applied when the transmission is shifted into reverse, the controller restarts the engine. If the engine is off and the brake pedal is unapplied when the transmission is shifted into reverse, the controller inhibits the engine from restarting until the brake pedal is applied. The controller can also be programmed to apply the electronic parking brake while the brake pedal remains unapplied after a predetermined time from the transmission being shifted into the reverse gear.

19 Claims, 3 Drawing Sheets

(51) Int. Cl.
- *B60W 10/11* (2012.01)
- *B60W 10/18* (2012.01)
- *F02D 41/06* (2006.01)
- *F02D 41/26* (2006.01)
- *F02N 11/08* (2006.01)
- *F02N 11/04* (2006.01)
- *F02N 11/00* (2006.01)
- *F02N 15/08* (2006.01)

(52) U.S. Cl.
CPC ........... *F02N 2011/0896* (2013.01); *F02N 2200/0802* (2013.01); *F02N 2200/0803* (2013.01); *F02N 2200/102* (2013.01); *Y02T 10/48* (2013.01)

(56) References Cited

U.S. PATENT DOCUMENTS

| | | | |
|---|---|---|---|
| 8,702,563 B1 | 4/2014 | Sangameswaran et al. | |
| 9,056,606 B1 * | 6/2015 | Rademacher | B60W 10/06 |
| 9,790,910 B2 * | 10/2017 | Quinteros | F02N 11/084 |
| 2002/0055410 A1 * | 5/2002 | Nagasaka | F16H 59/0204 |
| | | | 477/94 |
| 2010/0279816 A1 * | 11/2010 | Soliman | B60K 6/36 |
| | | | 477/3 |
| 2012/0283935 A1 * | 11/2012 | Gregori | B60W 50/087 |
| | | | 701/112 |
| 2014/0345556 A1 | 11/2014 | Okabe et al. | |

* cited by examiner

CONTROLLING ENGINE AUTO-START WHILE IN REVERSE

TECHNICAL FIELD

The present disclosure relates to a control strategy for a vehicle having an engine that is capable of and configured to stop and restart during travel to conserve fuel. More particularly, the present disclosure relates to controlling the engine of such a vehicle while the vehicle is in reverse.

BACKGROUND

Some automotive vehicles are equipped with a system for automatically stopping and restarting the engine during times of travel in which the vehicle is stopped. This is commonly known as a "stop-start" system and the vehicle can be referred to as a "micro-hybrid." Other hybrid vehicles are also known in which the engine can be stopped and the motor can be used to propel the vehicle.

The Federal Motor Vehicle Safety Standards (FMVSS), section 571.102 require that an engine in a vehicle may not automatically stop when the transmission is in reverse gear. The FMVSS also require that the engine may automatically restart while in reverse gear only if the vehicle satisfies two conditions: (1) when the engine is automatically stopped in a forward drive position and the driver selects Reverse, the engine restarts immediately whenever the service brake is applied, and (2) when the engine is automatically stopped in a forward drive position and the driver selects Reverse, the engine does not start automatically if the service brake is not applied.

SUMMARY

According to one embodiment, a vehicle includes an engine configured for stopping and restarting during travel, a multiple-ratio transmission, a brake pedal, an electronic parking brake, and a controller. The controller is programmed to shift the transmission into a reverse gear while the brake pedal is unapplied and the engine is off, and apply the electronic parking brake while the brake pedal remains unapplied after a predetermined time from the transmission being shifted into the reverse gear.

According to another embodiment, a vehicle includes an engine configured for stopping and restarting during travel, a transmission, a brake pedal, an electronic parking brake, and a controller. The controller is programmed to (i) in response to the transmission shifting into a reverse gear while the brake pedal is applied, restart the engine, and (ii) in response to the transmission shifting into the reverse gear while the brake pedal is unapplied, inhibit engine restarting until the brake pedal is applied.

According to yet another embodiment, a method comprises controlling a vehicle having an engine, a starter-generator, and a multiple-ratio transmission using at least one controller. The method also includes shifting the transmission into a reverse gear while an engine is off and a brake pedal is unapplied, and applying an electronic parking brake while the brake pedal remains unapplied in response to a predetermined time elapsing after the shifting.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
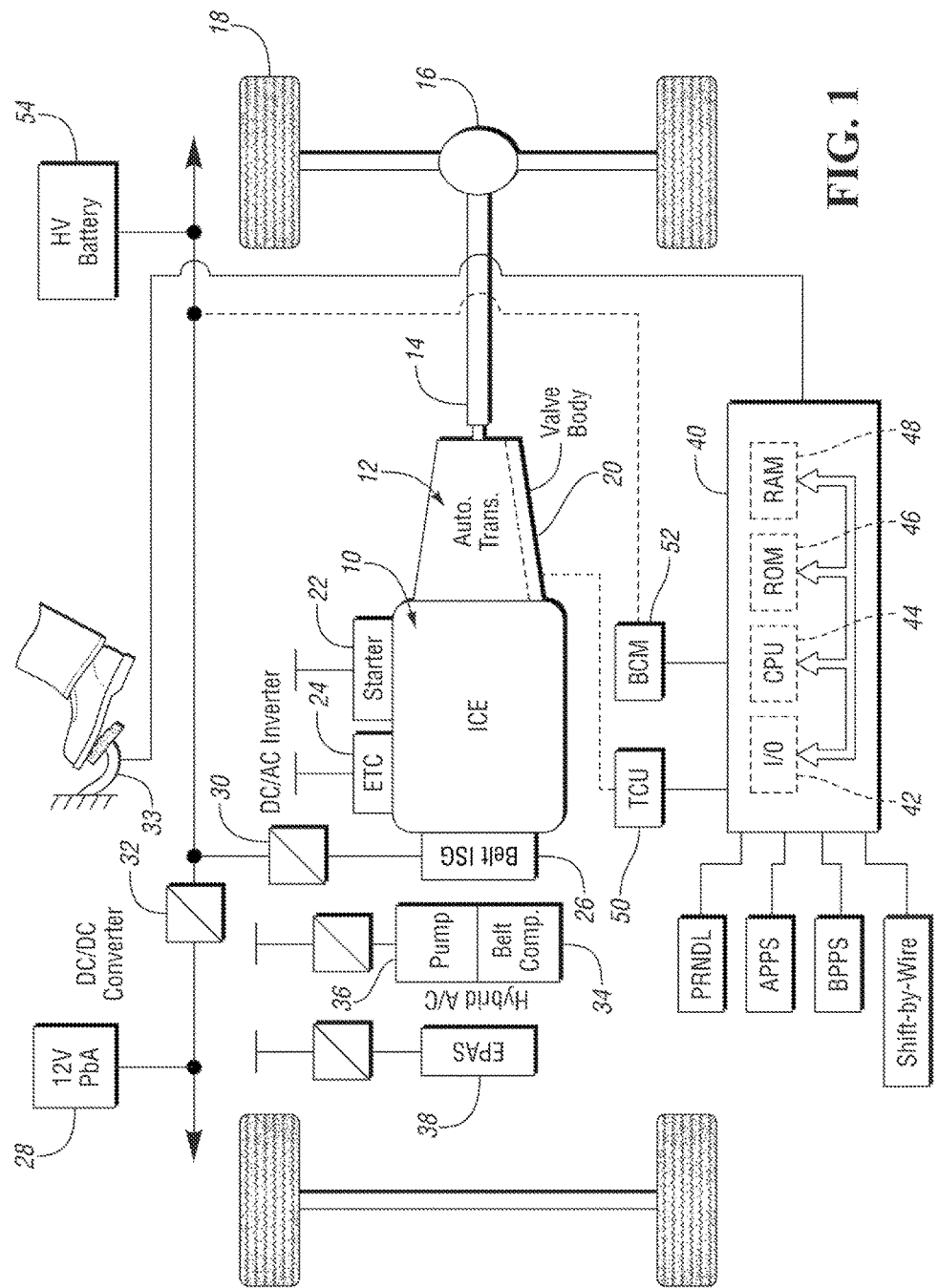
FIG. 1 is a schematic representation of an exemplary micro-hybrid vehicle powertrain system capable of implementing the control strategy described below.

FIG. 1 illustrates a schematic of a vehicle having an internal combustion engine 10 and a multiple-ratio automatic transmission 12. Torque delivered from a crankshaft of the internal combustion engine 10 is delivered through multiple-ratio gearing of the transmission 12 to a driveshaft 14 and to a final drive differential-and-axle assembly 16 for traction wheels 18. The gearing for the transmission 12 establishes multiple forward and reverse torque ratios under the control of a valve body 20. The ratios are established by engageable and disengageable clutches and brakes in a conventional fashion. The transmission may be configured for a neutral state by disengaging a forward drive clutch in usual fashion.

A starter motor, schematically shown at 22, under the control of a low voltage battery (not shown) can be used to start engine 10 under cold start conditions. An electronic throttle control for the engine 10 is shown at 24 in block diagram form.

The engine 10 is drivably connected to a crankshaft pulley, which drives a belt-driven starter-generator unit 26 in the exemplary embodiment of the invention disclosed herein. Although a belt-drive is shown as providing a driving connection between the engine 10 and the starter-generator 26, other types of driving connections could be used. For example, a flexible chain drive or a geared drive could be used, depending on design choice. These types of driving connections drivably connect the engine to the starter-generator 26. Micro-hybrids for automatically stopping and restarting the engine can be equipped with the belt-driven starter-generator rather than conventional hybrids in which a traction motor can start the engine. The starter-generator 26 is electrically coupled to a voltage source, such as a low voltage battery 28 or a high voltage battery 54. The high voltage battery 54 may be connected to the starter-generator 26 through a DC/AC inverter 30. Hybrid vehicle accessories, such as an air conditioning compressor 34, a fuel pump 36 and a power steering pump 38, which may be electrically powered by low voltage battery 28, also are illustrated in FIG. 1. The voltage sources may be separated by a DC/DC converter 32.

A brake pedal 33 is also shown in FIG. 1. The brake pedal 33 can be used to actuate friction braking and/or regenerative braking, as known in the art. The brake pedal 33 has an associated sensor configured to detect whether the brake pedal is applied, and the magnitude of brake pedal application, as known in the art. The associated sensor is coupled to a controller 40, as will be described below.

FIG. 1 also illustrates a powertrain microprocessor controller, or powertrain control unit 40. The controller 40 may include an input/output signal portion 42, a central microprocessor unit 44, a random access memory section 46 and a read-only memory section 48. The controller 40 is specifically programmed to control a transmission control unit 50, the engine operation (via an engine control module), and a battery control module 52, which is electrically coupled to the high voltage battery 54. The controller 40 is also coupled to an electronic parking brake (EPB) controller 53 or EPB module. The EPB controller 53 is configured to activate electronic parking brakes by activating a motor or other actuation device at brake calipers, according to conventional methods.

While illustrated as one controller, the controller 40 may be part of a larger control system and may be controlled by various other controllers throughout the vehicle, such as a vehicle system controller (VSC). It should therefore be understood that the powertrain control unit 40 and one or more other controllers can collectively be referred to as a "controller" that controls various actuators in response to signals from various sensors to control functions such as starting/stopping engine 10 during travel, selecting or scheduling transmission shifts, etc. The central processing unit (CPU) of the controller 40 may be in communication with various types of computer readable storage devices or media, such as volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller 40 communicates with various engine/vehicle sensors and actuators via the input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. The controller 40 may communicate signals to and/or from engine 10, the starter 22, the brake pedal 33, the DC/AC inverter 30, the high-voltage battery 54, the transmission gearbox 12, for example, as well as a gear selection member for selecting park/reverse/neutral/drive/low (PRNDL) or a shift-by-wire system rather than a mechanical lever shifting between PRNDL. Although not explicitly illustrated, those of ordinary skill in the art will recognize various functions or components that may be controlled by controller 40 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, starter-generator operation, clutch pressures for the transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch status (TCC), deceleration or shift mode (MDE), for example.

Figure 3:
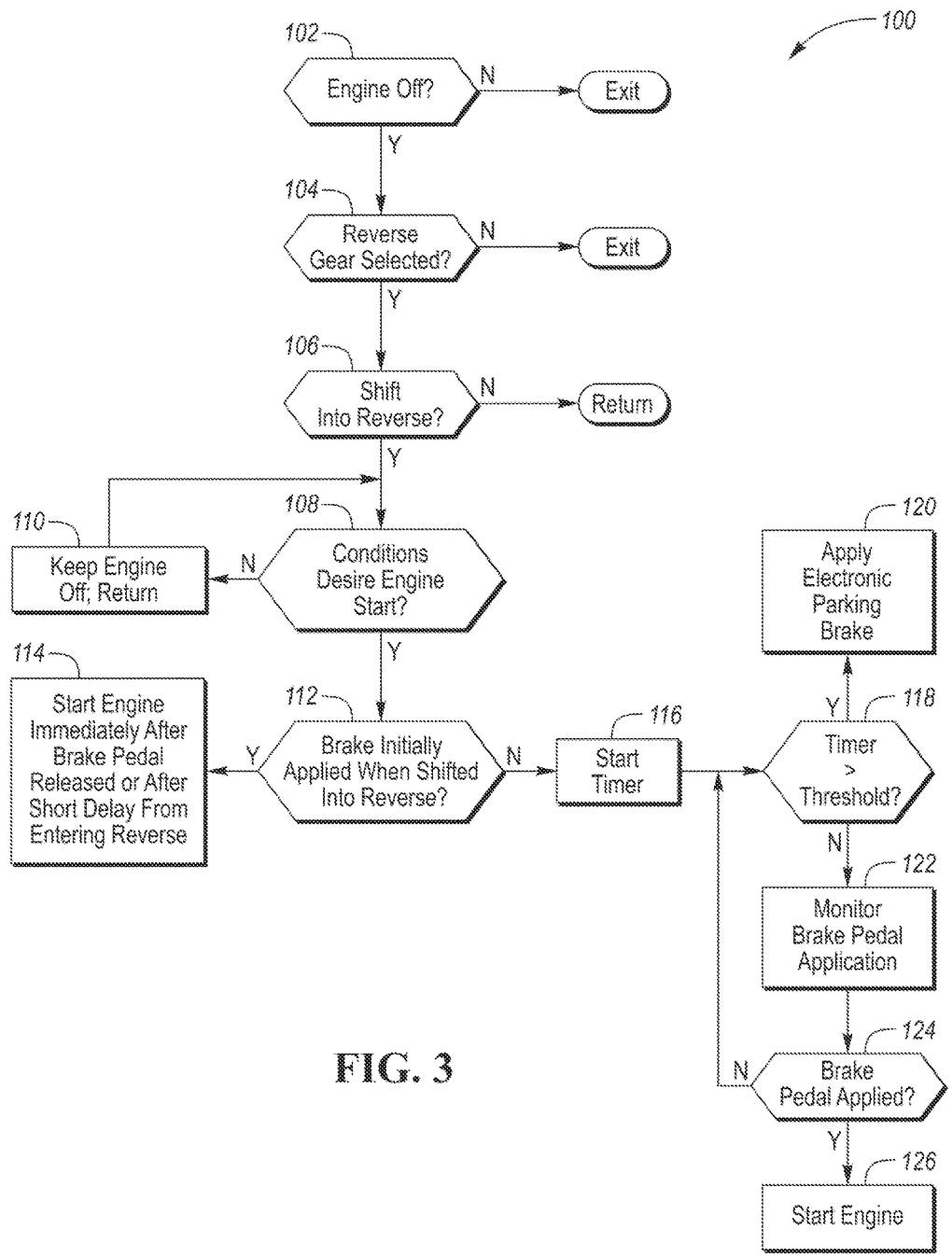
FIG. 3 is a flowchart showing an algorithm implemented by the controller described below for automatically restarting the engine while in reverse.

Control logic or functions performed by controller 40 may be represented by flow charts or similar diagrams in one or more figures, such as FIG. 3. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 40. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

Figure 2:
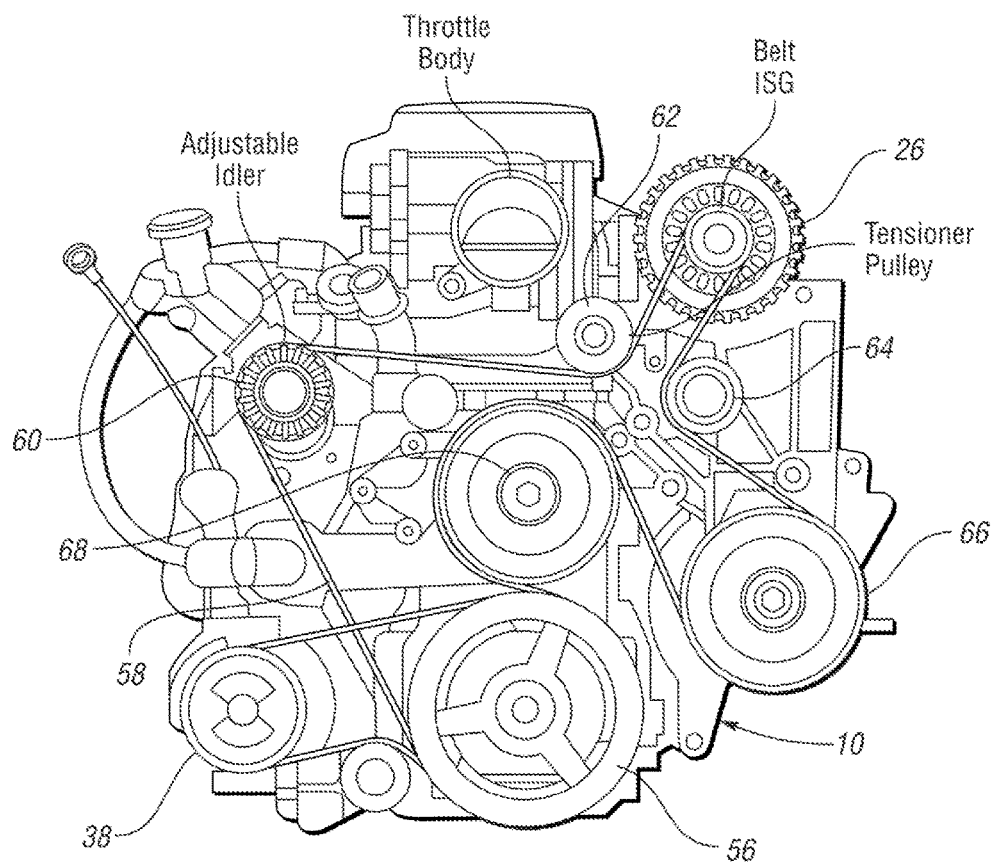
FIG. 2 is a schematic view of an internal combustion engine with a belt-driven, integrated starter-generator unit.

FIG. 2 is a more complete schematic illustration of the engine 10. The crankshaft of the engine 10 drives a crankshaft pulley, seen at 56 in FIG. 2. A crankshaft driven belt 58 is trained over the pulley 56, over an adjustable idler 60, over tensioner pulley 62, over a drive pulley for integrated starter-generator 26, tensioner pulley 64, accessory drive pulley 66 and camshaft drive pulley 68. The controller 40 communicates with the starter-generator and associated converter to engage and turn the engine to allow the engine to start ignition therein. Power steering pump 38 can have a separate mechanical connection.

It should be understood that the powertrain components of FIG. 1 are merely exemplary for a micro-hybrid vehicle in which the engine can stop and restart during vehicle operation. The control strategy disclosed herein can be implemented in various other micro- and macro-hybrid vehicle architecture. For example, the control strategy can be implemented with mild hybrid vehicles, plug-in hybrid electric vehicles (PHEVs), including power-split powertrain configurations, parallel hybrid configurations, and other hybrid vehicle architecture known in the art.

As explained above, and in any of the above vehicle configurations, the engine 10 is configured to start and stop during travel to conserve fuel. One advantageous time to stop the engine 10 is when the vehicle is motionless and in drive gear (for example, when the vehicle is stopped at a stop light). While the engine is automatically stopped, the driver may change the drive gear from "drive" to "reverse". This may or may not occur with application to the brake pedal. Meanwhile, the engine 10 might remain automatically stopped. Automatically starting the engine while the vehicle is in reverse could lead to a sudden torque boost realized at the wheels, if not a simple disturbance or distraction realized by the driver. This would not be desirable in many reverse driving scenarios in which the driver is precisely and intricately controlling the speed and direction of the vehicle.

According to various aspects of the present disclosure, a control strategy is provided for controlling the engine in a vehicle equipped with automatic start/stop capabilities, while the vehicle is operating in the reverse gear.

FIG. 3 illustrates a flow chart exemplifying an algorithm 100 for implementing a control strategy according to one embodiment. The control strategy occurs when the engine is automatically stopped while the vehicle is on and being driven, and is implemented when the PRNDL gear selector is shifted into reverse gear. This is illustrated by way of example at 102 in which the controller confirms that the engine is off, and at 104 in which the reverse gear is not initially selected when the engine is off, but is instead selected by the driver at 106 while the engine is off. In other words, the control strategy is implemented when the engine is automatically stopped and the driver subsequently selects the reverse gear after not initially being in reverse gear at the time the engine stopped. In other embodiments, the control strategy can be initiated when the engine is automatically stopped an a simple check is made to assure the reverse gear is selected.

If the engine is off, and the reverse gear is selected after not being initially selected at the moment the engine is automatically turned off, then the control strategy proceeds to 108. At 108, the controller monitors various signals to determine if an engine restart is desired according to conventional automatic engine stop/start control strategies. For example, the controller can monitor the state of charge of the batteries 28 and 54, the torque demands provided by the driver by way of accelerator pedal depression, the electric power consumed by accessory components such as the radio, or the cabin climate system (HVAC) power demands. In one particular example, the controller might typically request the engine to start based upon a high demand of heating or air conditioning demands in the vehicle cabin, as the batteries may not be equipped to handle such demands.

If there are no signals received by the controller indicating a desire to restart the engine, then at 110 the engine simply remains off while the vehicle is being operated in reverse. The process can return and continue to reevaluate the received signals to determine if and when any conditions might indicate the desire to restart the engine. However, as explained above, engine restarts while in demand may lead to unwanted torque boosts or general disturbances while the driver is manipulating the vehicle in reverse.

To account for and mitigate the potential disturbances that would be realized from the engine restarting, the control strategy does not blindly restart the engine whenever the conditions dictate a need for engine power. Instead, at 112, the controller first determines whether the brake pedal is applied and was applied when the vehicle was shifted into reverse. If so, then at 114 the engine is started immediately after the brake pedal is released, or after a short delay (e.g., 100 ms) from entering the reverse gear.

If the brake pedal is not depressed when the conditions dictate a need for engine power, then a timer is started at 116. Continuous evaluation of the timer and its relation with a predetermined threshold is made at 118. If the timer expires or exceeds the threshold at 118, then the controller applies the electronic parking brake at one or more of the wheels at 120. The engine can also go out of operation at this time, inhibiting any sort of automatic restart and instead requiring a full key-on event to restart the engine. Application of the electronic parking brake and the out-of-operation status of the engine prevents the batteries from being over-drained and the state of charge becoming too low.

If the timer does not exceed the threshold at 118, then the controller continues to monitor the brake pedal application at 122. At 124, the controller determines whether the brake pedal is applied. While no brake pedal application is requested, the process returns and continues to compare the timer to the predetermined threshold at 118. If, however, the brake pedal is applied while the timer does not exceed the threshold at 124, then the controller automatically permits the engine to restart at 126 and affirmatively restarts the engine.

Referring back to step 112, a second timer can be initiated when the transmission is shifted into reverse. This second timer can be a "reverse delay timer," which acts as a delay so as to not immediately shift into reverse the moment the transmission is commanded to shift into reverse. In one embodiment, this reverse delay timer initiates when entering reverse. If the brake pedal is applied at any time before the reverse delay timer expires, the engine will remain off. Alternatively, if the brake pedal is applied after the reverse delay timer expires, but before the timer at 118 expires, then the engine will restart.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A vehicle comprising:
   an engine configured for stopping and restarting during travel;
   a multiple-ratio transmission;
   a brake pedal;
   an electronic parking brake; and
   a controller programmed to shift the transmission into a reverse gear while the brake pedal is unapplied and the engine is off, and apply the electronic parking brake while the brake pedal remains unapplied after a predetermined time from the transmission being shifted into the reverse gear.

2. The vehicle of claim 1, wherein the controller is further programmed to restart the engine in response to application of the brake pedal while the transmission remains in the reverse gear.

3. The vehicle of claim 1, wherein the controller is further programmed to prevent the engine from restarting during the predetermined time while the brake pedal remains unapplied.

4. The vehicle of claim 3 further comprising a high-voltage battery, wherein the controller is further programmed to prevent the engine from restarting during the predetermined time while the brake pedal remains unapplied regardless of a state of charge of the battery.

5. The vehicle of claim 1, wherein the controller is further programmed to shift the transmission into the reverse gear while the brake pedal is applied and the engine is off, and restart the engine in response to the brake pedal being released.

6. The vehicle of claim 1, wherein the controller is further programmed to shift the transmission into the reverse gear while the brake pedal is applied and the engine is off, and restart the engine after a predetermined time from the shift of the transmission into the reverse gear while the brake pedal is applied and the engine is off.

7. The vehicle of claim 1, wherein the controller is further programmed to keep the engine off in response to the brake pedal being applied before a second predetermined time from the transmission being shifted into the reverse gear.

8. A vehicle comprising:
   an engine configured for stopping and restarting during travel;
   a transmission;
   a brake pedal;
   an electronic parking brake; and
   a controller programmed to
      in response to the transmission shifting into a reverse gear while the brake pedal is applied, restart the engine,
      in response to the transmission shifting into the reverse gear while the brake pedal is unapplied, inhibit engine restarting until the brake pedal is applied, and
      apply the electronic parking brake while the brake pedal remains unapplied after a predetermined time from the transmission shifting into the reverse gear.

9. The vehicle of claim 8, wherein the controller is further programmed to receive engine-restart signals, and inhibit the signals from causing the engine to restart until the brake pedal is applied while the transmission is in the reverse gear.

10. The vehicle of claim 9, further comprising a high-voltage battery, wherein one of the signals includes a state of charge of the battery.

11. The vehicle of claim 8, wherein the restart of the engine is commanded by the controller in response to the brake pedal being released.

12. The vehicle of claim 8, wherein the restart of the engine is commanded by the controller in response to a time delay after the transmission has shifted into the reverse gear.

13. The vehicle of claim 8, further comprising a belt-driven starter-generator selectively drivably coupled to the engine, wherein the controller is programmed to restart the engine via the belt-driven starter-generator.

14. A method comprising:
   controlling a vehicle having an engine, a starter-generator, and a multiple-ratio transmission using at least one controller;
   shifting the transmission into a reverse gear while an engine is off and a brake pedal is unapplied; and
   applying an electronic parking brake while the brake pedal remains unapplied in response to a predetermined time elapsing after the shifting.

15. The method of claim 14 further comprising restarting the engine in response to application of the brake pedal while the transmission remains in the reverse gear.

16. The method of claim 14 further comprising preventing the engine from restarting prior to the predetermined time elapsing while the brake pedal remains unapplied.

17. The method of claim 16, wherein the preventing occurs regardless of a state of charge of a high-voltage battery of the vehicle.

18. The method of claim 14 further comprising shifting the transmission into the reverse gear while the brake pedal is applied and the engine is off, and restarting the engine in response to the brake pedal being released.

19. The method of claim 14 further comprising shifting the transmission into the reverse gear while the brake pedal is applied and the engine is off, and restarting the engine in response to a predetermined time delay elapsing from the shifting of the transmission into the reverse gear while the brake pedal is applied.

* * * * *